United States Patent Office.

JOHN L. OTIS, OF LEEDS, MASSACHUSETTS.

Letters Patent No. 100,659, dated March 8, 1870.

IMPROVEMENT IN EMERY-WHEELS.

The Schedule referred to in these Letters Patent and making part of the same.

*To all whom it may concern:*

Be it known that I, JOHN L. OTIS, of Leeds, in the county of Hampshire, and State of Massachusetts, have invented certain new and useful Improvements in Solid Emery-Wheels, for polishing, sharpening, and grinding; and I do hereby declare the following to be a full, clear, and exact description of the same.

The emery-wheels in present use are liable to become heated or glazed, and cannot be used with water in some cases. These difficulties, though not so important in special cases, are very objectionable in the general use and application of such wheels to such varied purposes as they are applied to.

The object and purpose of my invention is to produce an emery-wheel applicable to any and all of the purposes of polishing, grinding, or sharpening, in any of the commonly-used metals, such as steel, iron, or brass, and which will resist heating and glazing, and that can be used with or without water, as the character of the work to be done may require; and My invention consists in making solid emery-wheels from a composition of emery, boiled linseed-oil, "baking Japan," and with or without litharge as a drier, said composition being pressed into molds of the required form and size, and baked in an oven until thoroughly hardened.

To enable others skilled in the art to make and use my invention, I proceed to describe the same as follows:

To about one pound of emery I add and thoroughly mix two parts of "baking Japan," three parts of well-boiled linseed-oil, and when litharge is used, about one-eighth part of weight of the Japan and oil in litharge. When these ingredients are well mixed, the composition is pressed into a mold of the proper form and size, and baked in an oven until thoroughly hardened.

I have mentioned the proportions of the ingredients which I find in practice to answer the best purpose, but they may be varied somewhat in their proportions, and still answer a good purpose, and I therefore do not confine myself to the precise proportions mentioned, but claiming the thing produced when it is composed of the ingredients named, in such a proportion as will put the mass in a sufficiently plastic condition to be molded into the proper form or size in molds, and then baked in an oven into a solid hard substance, capable of resisting the force in abrading hard metals.

The litharge, though mainly used as a drier, acts in connection with the oil and the "Japan" as a solidifying ingredient, by entering the minutest interstices between the particles of emery, and solidly, by the baking, cementing the whole mass. The litharge may, however, be omitted from the composition.

Having thus fully described my invention,

What I claim as new, and desire to secure by Letters Patent, is—

An emery-wheel, for polishing, grinding, or sharpening, composed of emery, "baking Japan," boiled linseed-oil, and with or without litharge, molded into the desired shape and form, and baked in an oven, as herein described and represented.

J. L. OTIS.

Witnesses:
   A. R. MORSE,
   H. P. OTIS.